United States Patent
Nguyen

(10) Patent No.: US 10,598,204 B2
(45) Date of Patent: Mar. 24, 2020

(54) ANTI-VIBRATION LOCKING CONNECTOR

(71) Applicant: ITT Manufacturing Enterprises, LLC, Wilmington, DE (US)

(72) Inventor: Le Huu Nguyen, Irvine, CA (US)

(73) Assignee: ITT MANUFACTURING ENTERPRISES, LLC, Wilmington, DE (US)

(*) Notice: Subject to any disclaimer, the term of this patent is extended or adjusted under 35 U.S.C. 154(b) by 370 days.

(21) Appl. No.: 15/424,003

(22) Filed: Feb. 3, 2017

(65) Prior Publication Data

US 2018/0223888 A1    Aug. 9, 2018

(51) Int. Cl.

| | | |
|---|---|---|
| H01R 13/622 | (2006.01) | |
| F16B 21/07 | (2006.01) | |
| F16B 7/18 | (2006.01) | |
| F16B 39/02 | (2006.01) | |
| F16B 1/00 | (2006.01) | |
| H01R 13/627 | (2006.01) | |

(52) U.S. Cl.
CPC ........... F16B 21/073 (2013.01); F16B 7/182 (2013.01); F16B 39/02 (2013.01); H01R 13/622 (2013.01); F16B 2001/0064 (2013.01); H01R 13/6276 (2013.01)

(58) Field of Classification Search
CPC ....... H01R 13/62; H01R 13/622; F16L 37/10; F16L 37/101; F16L 37/23
See application file for complete search history.

(56) References Cited

U.S. PATENT DOCUMENTS

| | | | |
|---|---|---|---|
| 3,587,032 A * | 6/1971 | Normann | H01R 13/621 439/321 |
| 4,457,469 A | 7/1984 | Ratchford | |
| 4,457,572 A | 7/1984 | Frazier et al. | |
| 4,478,473 A * | 10/1984 | Frear | H01R 13/622 439/312 |
| 4,547,032 A | 10/1985 | Burns et al. | |
| 9,528,646 B2 | 12/2016 | Hyzin | |

(Continued)

FOREIGN PATENT DOCUMENTS

| | | |
|---|---|---|
| EP | 2950401 A1 | 12/2015 |
| GB | 588059 A | 5/1947 |

OTHER PUBLICATIONS

Extended European Search Report for European Application No. 18 151 162.7, dated Jun. 14, 2018, 8 pages.

*Primary Examiner* — Michael P Ferguson

(74) *Attorney, Agent, or Firm* — Leason Ellis LLP

(57) ABSTRACT

A connector includes a body having gear teeth. A first sleeve is rotatably coupled to the body. A moveable member is positioned in a hole of the first sleeve. A second sleeve is movable with respect to the first sleeve between a locked and unlocked positions. A releasable locking member is positioned between the moveable member and the gear teeth. In the unlocked position of the second sleeve, a recess formed in the second sleeve is aligned with the opening. Upon rotation of the first sleeve, the moveable member is translated into the recess as the releasable locking member travels along the gear teeth. In the locked position of the second sleeve, the recess is rotationally spaced from the opening, and, the releasable locking member is sandwiched between the gear teeth and the moveable member to prevent rotation of the first sleeve with respect to the connector body.

19 Claims, 12 Drawing Sheets

(56) References Cited

U.S. PATENT DOCUMENTS

| 9,666,973 | B1* | 5/2017 | Strahl | ................. | H01R 13/622 |
| 2016/0020552 | A1* | 1/2016 | Strahl | ................. | H01R 13/622 |
| | | | | | 439/321 |

* cited by examiner

ANTI-VIBRATION LOCKING CONNECTOR

FIELD OF THE INVENTION

The present invention relates to a locking connector that resists unlocking during vibration.

BACKGROUND OF THE INVENTION

Connectors can be susceptible to uncoupling due to vibration or other external forces. Disclosed herein is a connector that is capable of withstanding vibration or other external forces without uncoupling from another connector.

SUMMARY OF THE INVENTION

According to one aspect of the invention, a connector comprises a connector body including an outer surface defining a longitudinal axis and gear teeth disposed on the outer surface. A first sleeve is rotatably coupled to said connector body. A second sleeve is positioned over said first sleeve and is movable with respect to the first sleeve between a locked position and an unlocked position. A releasable locking member is at least partially positioned between the gear teeth and the first sleeve. The releasable locking member has a mating surface configured to engage the gear teeth of the connector body. The unlocked position of the second sleeve permits translation of said mating surface of said releasable locking member toward said first sleeve to facilitate sliding of said mating surface along said gear teeth of said connector body upon rotation of said first sleeve with respect to said connector body. The locked position of the second sleeve prevents said translation.

According to another aspect of the invention, a connector comprises a connector body including an outer surface defining a longitudinal axis and gear teeth disposed on the outer surface. A first sleeve is rotatably coupled to said connector body, and first sleeve has a sidewall including a hole formed in the sidewall. A moveable member is positioned in the hole of the first sleeve. A second sleeve is positioned over said first sleeve and is movable with respect to the first sleeve between a locked position and an unlocked position, said second sleeve having a sidewall including a recess. A releasable locking member is at least partially positioned between the moveable member and the gear teeth. The releasable locking member has a mating surface configured to engage the gear teeth of the connector body. In the unlocked position of the second sleeve, said recess is configured to at least partially rotationally align with said opening, and, upon rotation of said first sleeve, said moveable member is configured to translate into said recess of said second sleeve to facilitate sliding of said mating surface of said releasable locking member along said gear teeth of said connector body. In the locked position of the second sleeve, said recess is rotationally spaced from said opening, and, said mating surface of said releasable locking member is locked between said gear teeth of said connector body and said moveable member to prevent rotation of said first sleeve with respect to said connector body.

BRIEF DESCRIPTION OF THE DRAWINGS

The invention is best understood from the following detailed description when read in connection with the accompanying drawings, with like elements having the same reference numerals. Included in the drawings are the following figures.

DETAILED DESCRIPTION OF THE INVENTION

Figure 1:
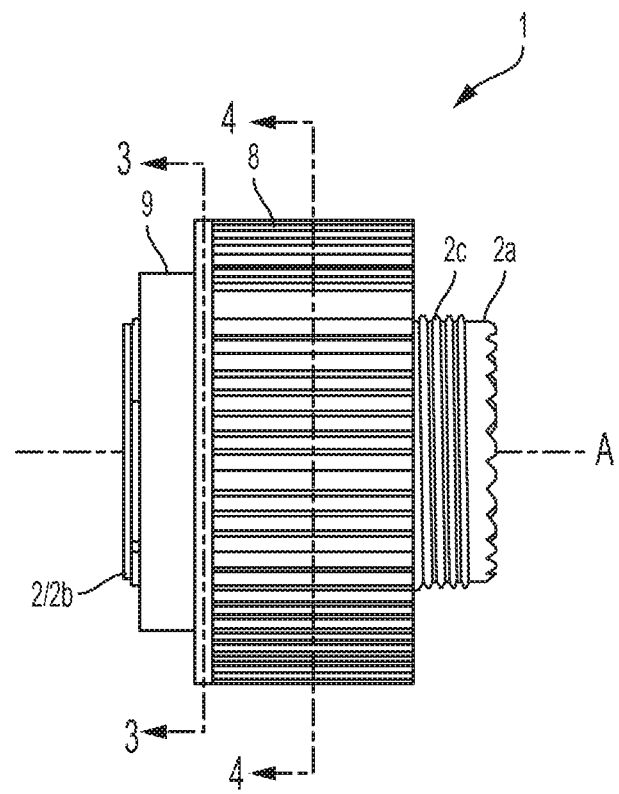
FIG. 1 is an elevation view taken from the left hand side of a connector according to one exemplary embodiment of the invention, wherein the connector is shown in a locked state.
Figure 2:
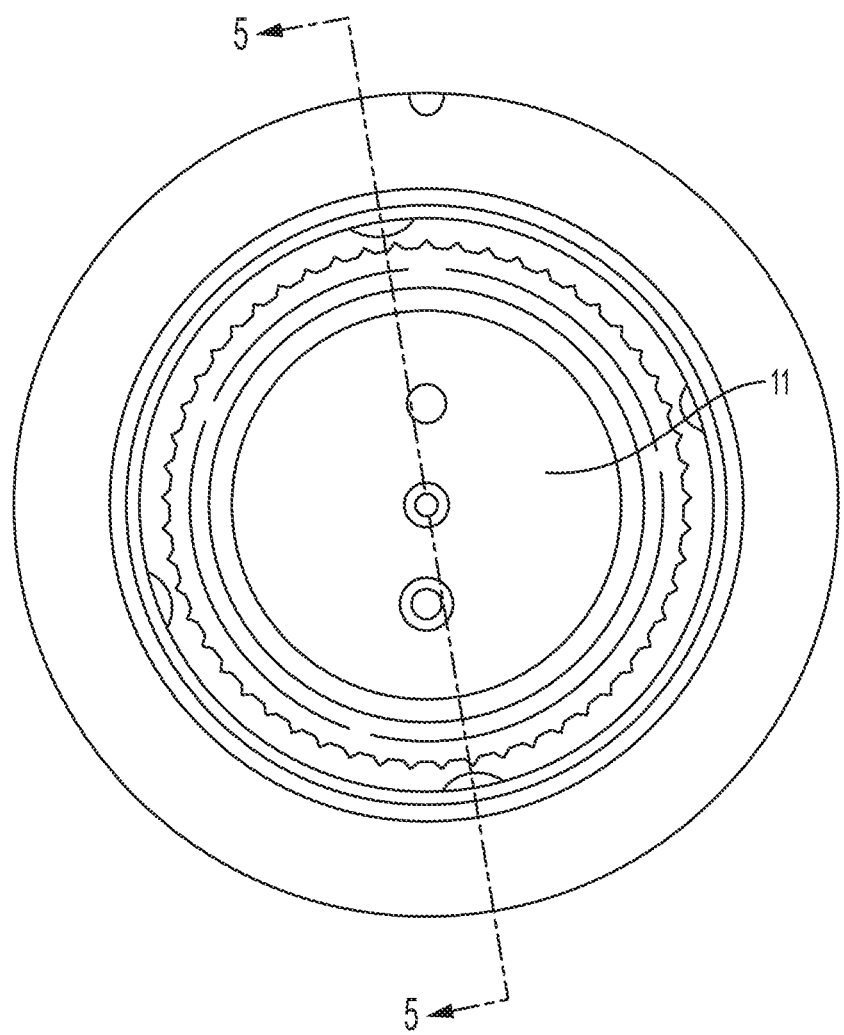
FIG. 2 is a front elevation view of the connector of FIG. 1.
Figure 3:
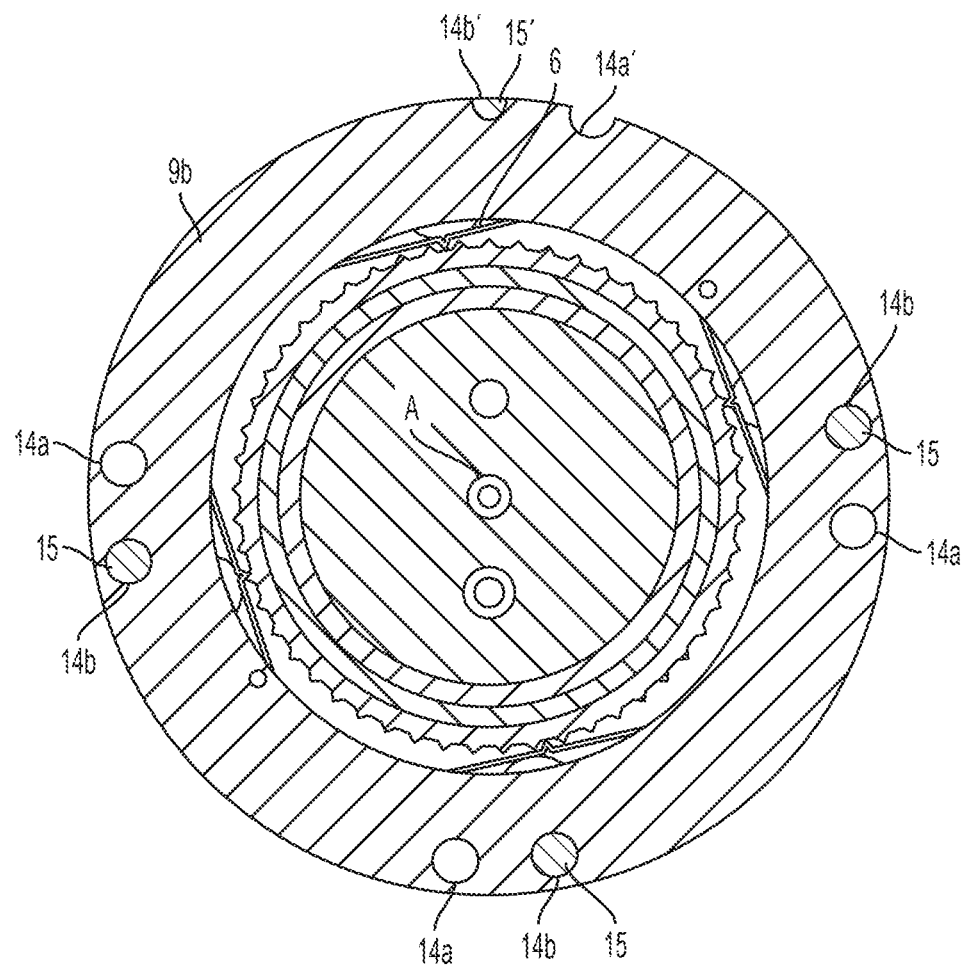
FIG. 3 is a cross-sectional view of the connector taken along the lines 3-3 in FIG. 1.

FIGS. 1-12 depict a connector 1 that is capable of withstanding vibration or other external forces without uncoupling. The connector 1 may also be referred to as an adapter or a coupler. The connector 1 may be used in various applications, such as a fluid application or an electrical application. Although not shown herein, the connector 1 is configured to be mated to a mating connector, such as the mating connector 104 shown in U.S. Pat. No. 9,528,646 to ITT Manufacturing Enterprises LLC. U.S. Pat. No. 9,528,646 (the '646 Patent) is incorporated by reference herein in its entirety and for all purposes.

Unless otherwise specified, each of the components of the connector 1 has a substantially cylindrical shape that is revolved about a longitudinal axis 'A' and each of the components has a substantially hollow interior. Also, as used herein, the term 'distal' refers to a position either at or toward a first end 2a of a connector body 2, and the term 'proximal' refers to a position either at or toward the second end 2b of the connector body 2. The phrases 'inner,' 'inside facing' or 'interior facing' refer to a surface or feature that faces toward the longitudinal axis 'A', while the phrases 'outer', 'outside facing' or 'exterior facing' refer to a surface or feature that faces away from the longitudinal axis 'A'.

Referring now to FIGS. 1-5 and 11, the connector 1 includes a connector body 2 upon which the remaining components of the connector 1 are mounted either directly or indirectly.

Connection means 2c are provided on the outer surface of the first end 2a of the connector body 2 for releasably mating with a backshell (not shown) or a strain relief (not shown), for example. According to this exemplary embodiment, the connection means 2c are male mechanical threads. The connection means 2c could be, for example, female mechanical threads, a bayonet connection, a clip, a clamp, a fastener, a post, a prong, a spring, a ring, a friction fit, or an adhesive.

The second end 2b of the connector body 2 includes a series of axially-extending lugs 2d that are slidably positioned within axially-extending channels 105 (one shown) of the mating connector 104 shown in the '646 Patent. Engagement between the lugs 2d and the channels 105 permit axial translation, yet prevent relative rotation, between the connector body 2 and the mating connector 104. It should be understood that the connector body 2 could include the channels and the mating connector 104 could include the lugs to achieve the same result.

A series of gear teeth 4 extend radially outward from the outside facing surface of the connector body 2, and are uniformly positioned about the circumference of the connector body 2. The teeth 4 may be positioned about the entire circumference of the connector body 2. The fillet, face and flank of each tooth 4 extend in an axial direction along the longitudinal axis A. As will be described later, a series of springs 6 are configured to interact with the gear teeth 4.

The connector body 2 also includes a recess 5 formed on its outer surface in which a retaining ring 3 is fixedly positioned. The recess 5 is positioned at an axial location between teeth 4 and connection means 2c.

The interior region of the connector body 2 includes components 11 comprising a dielectric material and electrical contacts for establish an electrical connection with mating connectors. Alternatively, the interior region of the connector body 2 may be hollow and the hollow space may be used to accommodate a cable (not shown) passing therethrough, for example. The cable may contain one or more wires or a passage for fluid for example. As another alternative, the hollow interior region of the connector body 2 may be used for the passage of fluid.

Figure 5:
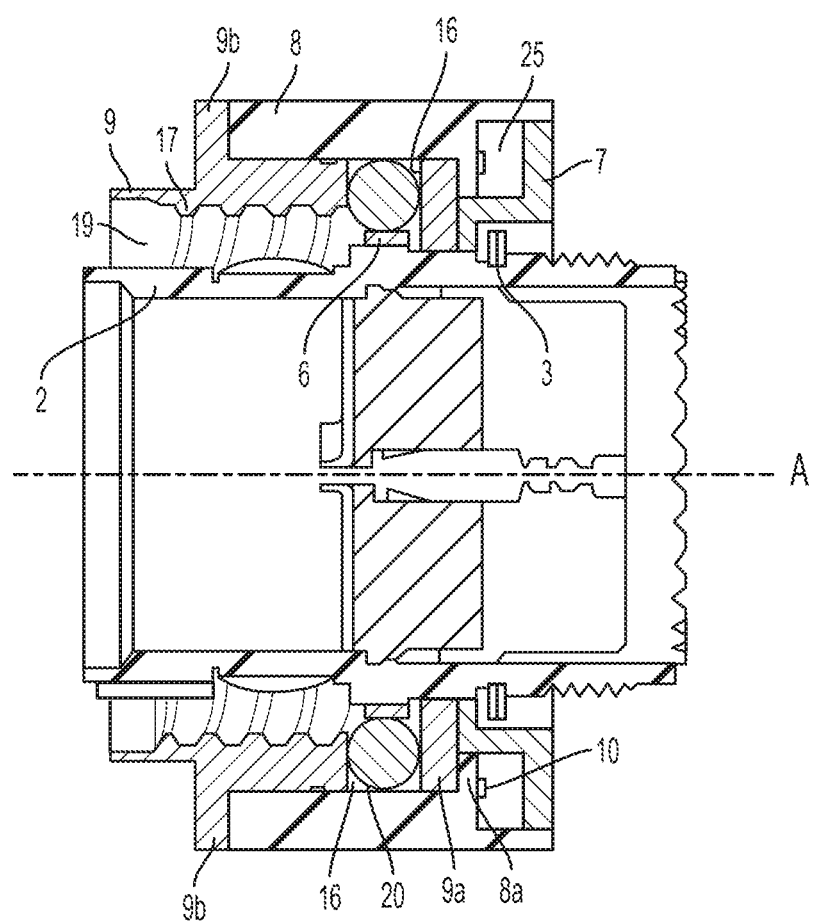
FIG. 5 is a cross-sectional view of the connector taken along the lines 5-5 in FIG. 2.
Figure 6:
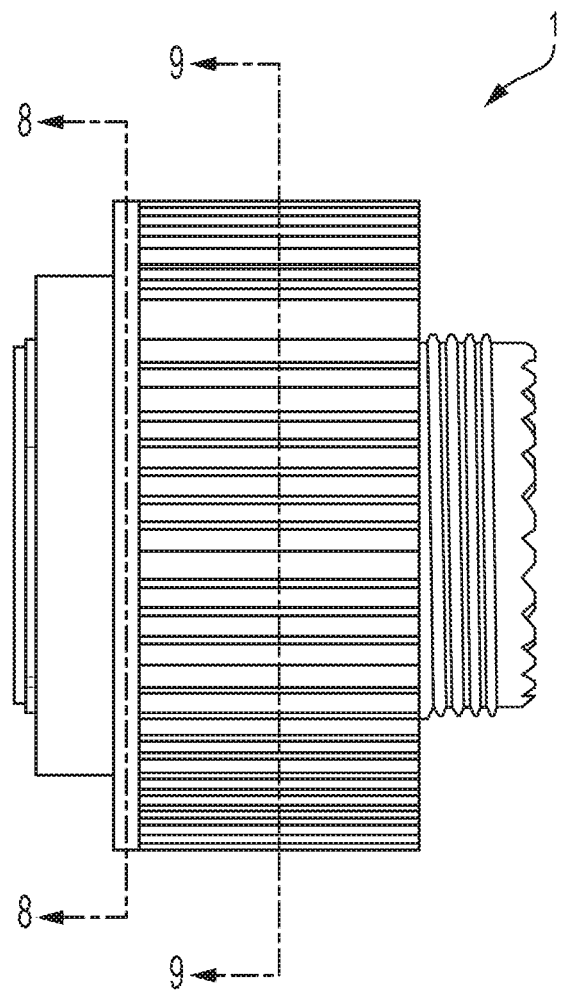
FIG. 6 is an elevation view taken from the left hand side of the connector of FIG. 1, wherein the connector is shown in an unlocked state.
Figure 7:
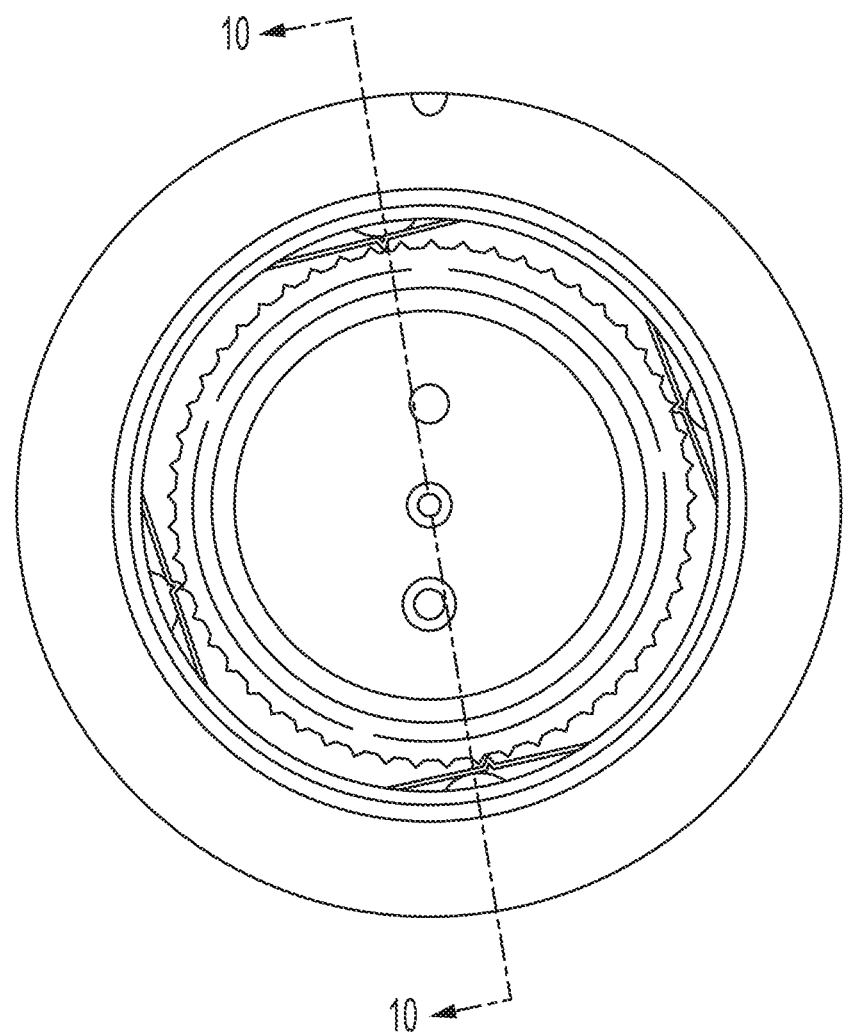
FIG. 7 is a front elevation view of the connector of FIG. 6.
Figure 8:
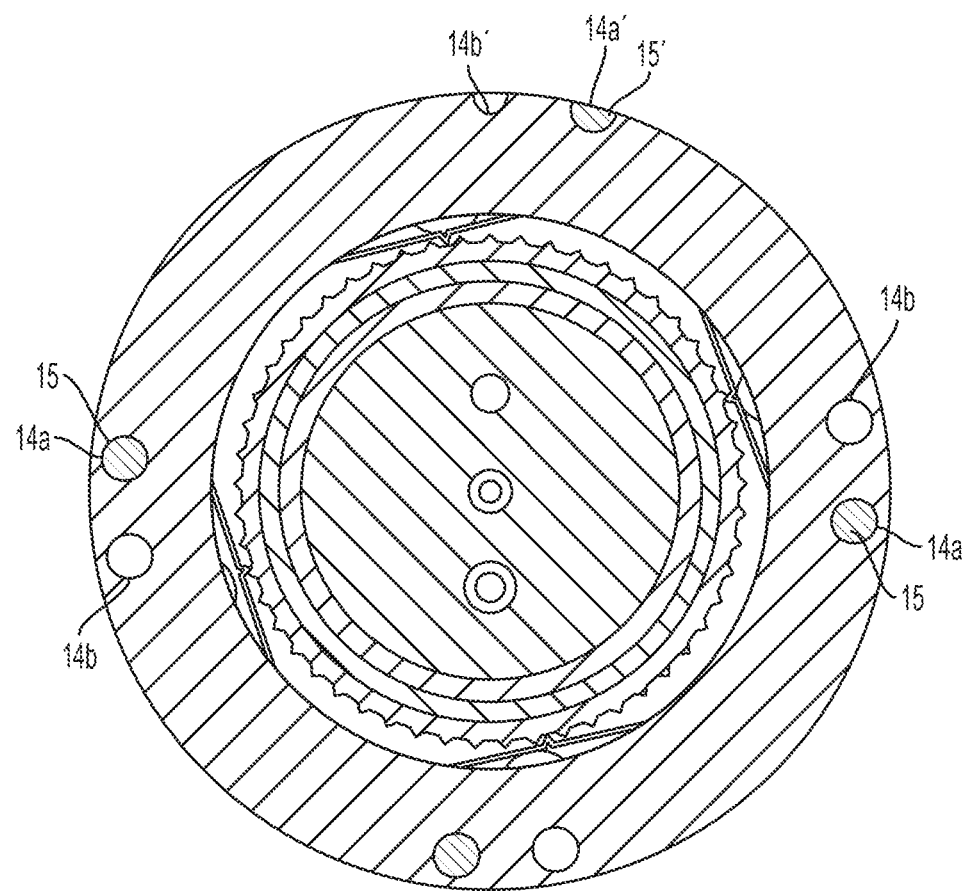
FIG. 8 is a cross-sectional view of the connector taken along the lines 8-8 in FIG. 6.

As best shown in FIG. 5, an inner sleeve 9 is mounted to the outer surface of the connector body 2 such that, in the unlocked state of the connector 1, the inner sleeve 9 is capable of rotating freely in clockwise and counterclockwise directions on the surface of the connector body 2. The inner sleeve 9 is radially positioned between an outer sleeve 8 and the connector body 2. An inwardly extending shoulder 9a at the distal end of the inner sleeve 9 that is axially positioned between the teeth 4 of the connector body 2 and a spring retainer 7. Both the inner sleeve 9 and the spring retainer 7 are limited from translating along the longitudinal axis "A," with respect to the connector body 2, because those components are sandwiched between the ring 3 and the distal face of the teeth 4 of the body 2.

The connection means 17 are provided on the inside facing surface of the inner sleeve 9 for releasably mating with the connection means 106 of the mating connector 104 of the '646 Patent. Upon mating the connector 104 with the connector 1, the connector 104 is at least partially positioned within the annular space 19 that is defined between the body 2 and the inner sleeve 9. According to this exemplary embodiment, the connection means 17 and 106 are mechanical threads. The connection means could be, for example, a bayonet connection, a clip, a clamp, a fastener, a post, a prong, a spring, a ring, a friction fit, or an adhesive.

Figure 4:
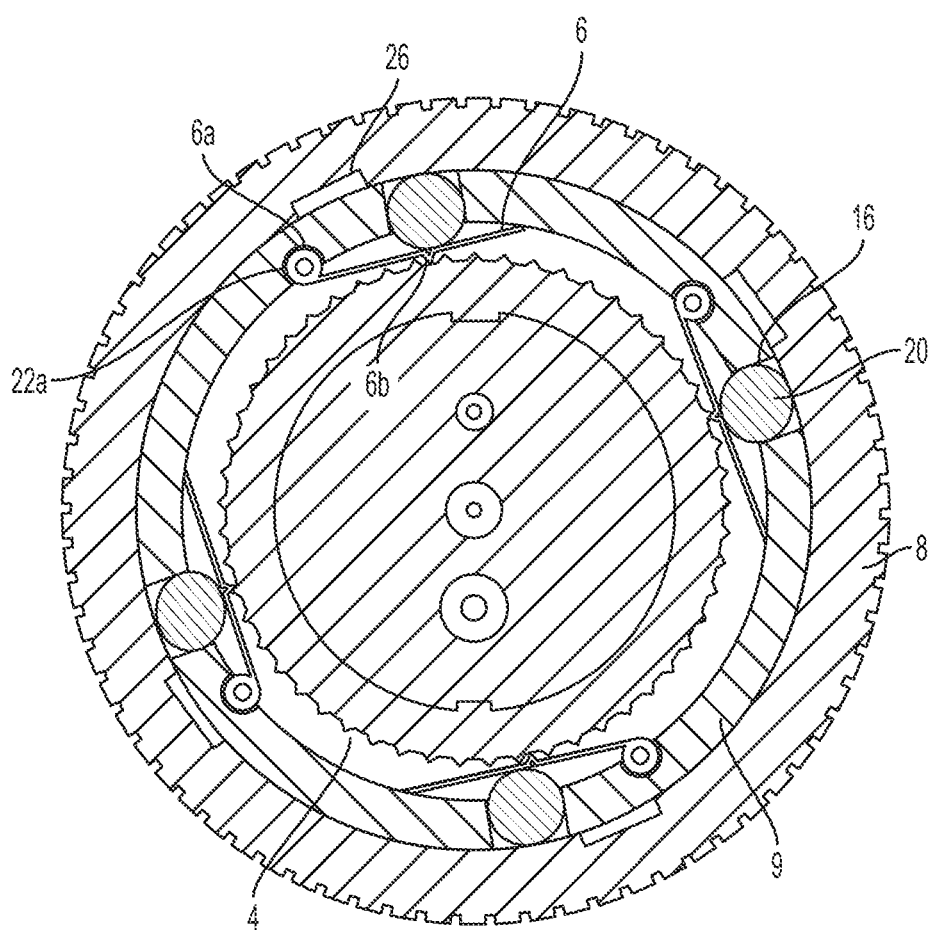
FIG. 4 is a cross-sectional view of the connector taken along the lines 4-4 in FIG. 1.

A series of four circular through holes 16 are defined on the exterior surface of the inner sleeve 9 at a location distal of connection means 17. As best shown in FIG. 4, the holes 16 are uniformly spaced about the circumference of the inner sleeve 9. The holes 16 are also axially aligned along the longitudinal axis A. In an assembled from of the connector 1, a ball 20 (also referred to herein as a moveable member) is positioned within each hole 16.

Figure 11:
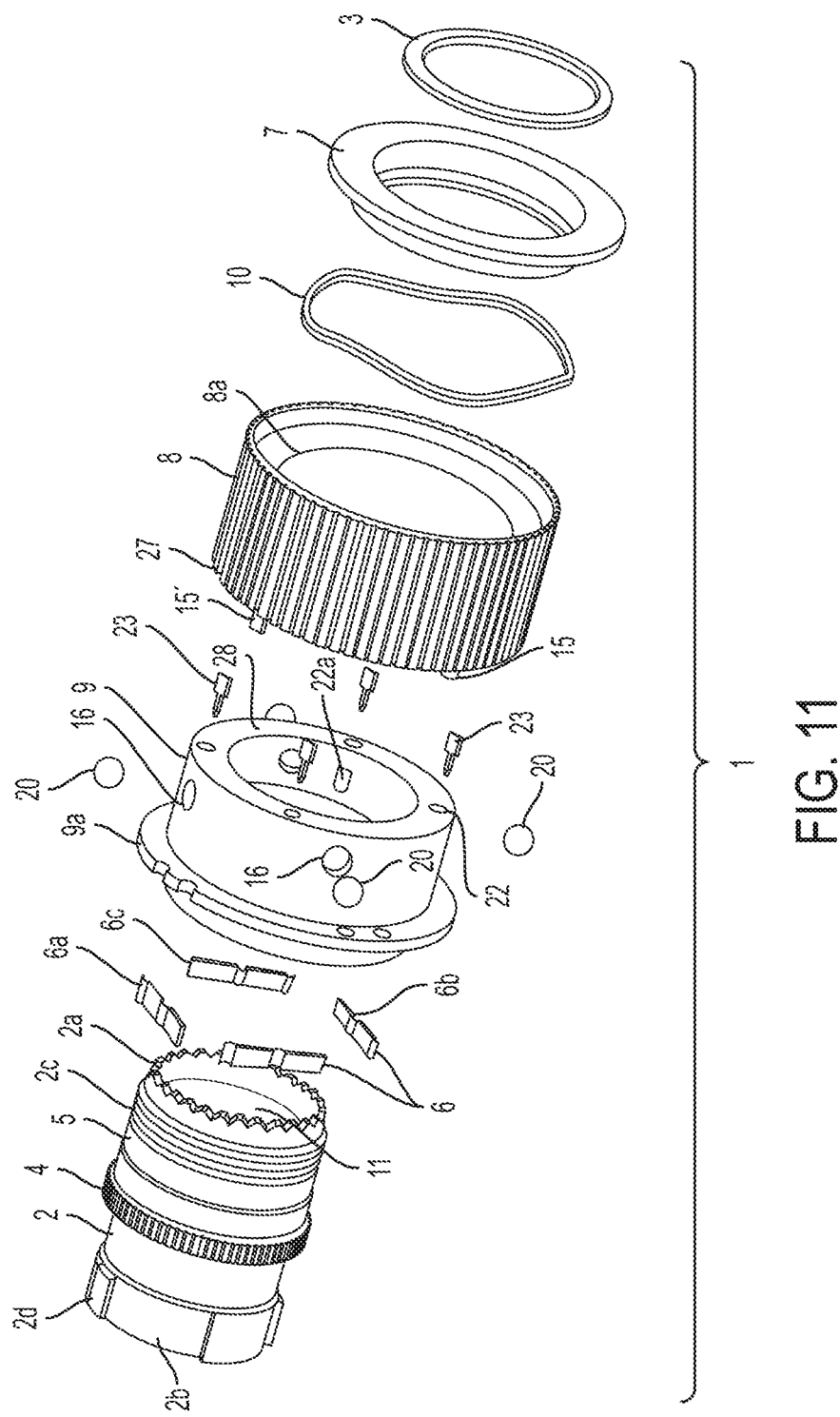
FIG. 11 is an exploded view of the connector of FIG. 1.

As best shown in FIGS. 4 and 11, a series of four holes 22 are defined on the distal face of the inner sleeve 9. Each hole 22 terminates at a cutout 22a, which is formed on the interior facing wall of the inner sleeve 9. Each hole 22 extends parallel to the longitudinal axis A. The holes 16 are equally spaced in a radial direction from the longitudinal axis A, and are uniformly spaced apart by 90 degrees about the longitudinal axis A.

In an assembled form of the connector 1, a single pin 23 is positioned within each hole 22, and a hinge 6a of a spring 6 is rotatably positioned within respective cutouts 22a. The small-diameter end of each pin 23 is positioned through the hinge 6a of a respective spring 6 so as to captivate the hinge 6a in a respective cutout 22a of the inner sleeve 9.

The outer surface of the inner sleeve 9 includes an outwardly extending shoulder 9b. The proximal end of the outer sleeve 8 is configured to abut the distal facing surface of the shoulder 9b. The shoulder 9b includes three sets of adjacent openings 14a and 14b (six total openings) and one set of openings 14a' and 14b' (two total openings) that extend in an axial direction through the shoulder 9b. The sets of adjacent openings 14a/14b and 14a/14b' are uniformly spaced about the circumference of the shoulder 9b. Each opening 14a and 14b is sized and positioned to receive a post 15 extending from the proximal face of the outer sleeve 8, and each opening 14a' and 14b' is sized and positioned to receive a post 15' extending from the proximal face of the outer sleeve 8. The outer sleeve 8 includes three posts 15 and one post 15'. Each post 15 is capable of mating with only one opening (i.e., either opening 14a or opening 14b) of a single set of adjacent openings 14a and 14b at any one time; and, post 15' is capable of mating with only one opening (i.e., either opening 14a' or opening 14b') at any one time, as will be described in greater detail later.

The first set of adjacent openings 14a' and 14b' is different from the remaining three sets of adjacent openings 14a and 14b. More particularly, the first set of adjacent openings 14a' and 14b' are positioned further from the longitudinal axis A than the remaining three sets of adjacent openings 14a and 14b. Also, the first set of adjacent openings 14a' and 14b' are recesses formed on the outermost surface of the shoulder 9b, whereas the remaining three sets of adjacent openings 14a and 14b are circular holes formed through the thickness of the shoulder 9b.

Because the first set of adjacent openings 14a' and 14b' are positioned at a different distance from the longitudinal axis A than the remaining three sets of adjacent openings 14a and 14b, the inner sleeve 9 is keyed to the outer sleeve 8 so that each post 15 is assigned to a single set of openings 14a and 14b. It follows that the post 15' is assigned to, and can only mate with, the first set of openings 14a' and 14b'. It also follows that the post 15' is positioned further from the longitudinal axis A than the remaining three posts 15.

Referring now to FIGS. 5 and 11, the outer sleeve 8 is a substantially cylindrical body that substantially surrounds and encloses the inner sleeve 9, the connector body 2 and the spring retainer 7. In use, the outer sleeve 8 is configured to translate along the longitudinal axis A, and, upon being translated in the distal direction, the outer sleeve 8 is configured to rotate about the inner sleeve 9. The outer sleeve 8 may be configured to rotate about the inner sleeve 9 to a limited degree and only between the positions shown in FIGS. 4 and 9. Alternatively, the outer sleeve 8 may be configured to rotate about the inner sleeve 9 by three-hundred and sixty degrees and without restriction.

The outer sleeve 8 includes a knurled revolved outside facing surface for grasping by a user. Those skilled in the art will recognize that the outside facing surface of the outer sleeve 8 may have other features for facilitating grasping by a user. The revolved outside surface of the outer sleeve 8 may include indicia identifying the locked and unlocked positions of the outer sleeve 8.

As noted above, the outer sleeve 8 includes a set of three posts 15 that are configured to engage the openings 14a and 14b, and one post 15' that is configured to engage the openings 14a' and 14b'. As best shown in FIG. 11, each post 15 extends outwardly from the proximal end 27 of the outer sleeve 8. Each post 15 may be cylindrical in shape. The posts 15/15' are radially spaced about the circumference of the outer sleeve 8 in a uniform manner (i.e., separated by ninety degrees). The post 15' is specially configured to engage only with openings 14a' and 14b'. The post 15' is positioned further from the longitudinal axis A than the remaining three posts 15, however, those skilled in the art will recognize that other solutions exist for keying the outer sleeve 8 and the inner sleeve 9.

Figure 9:
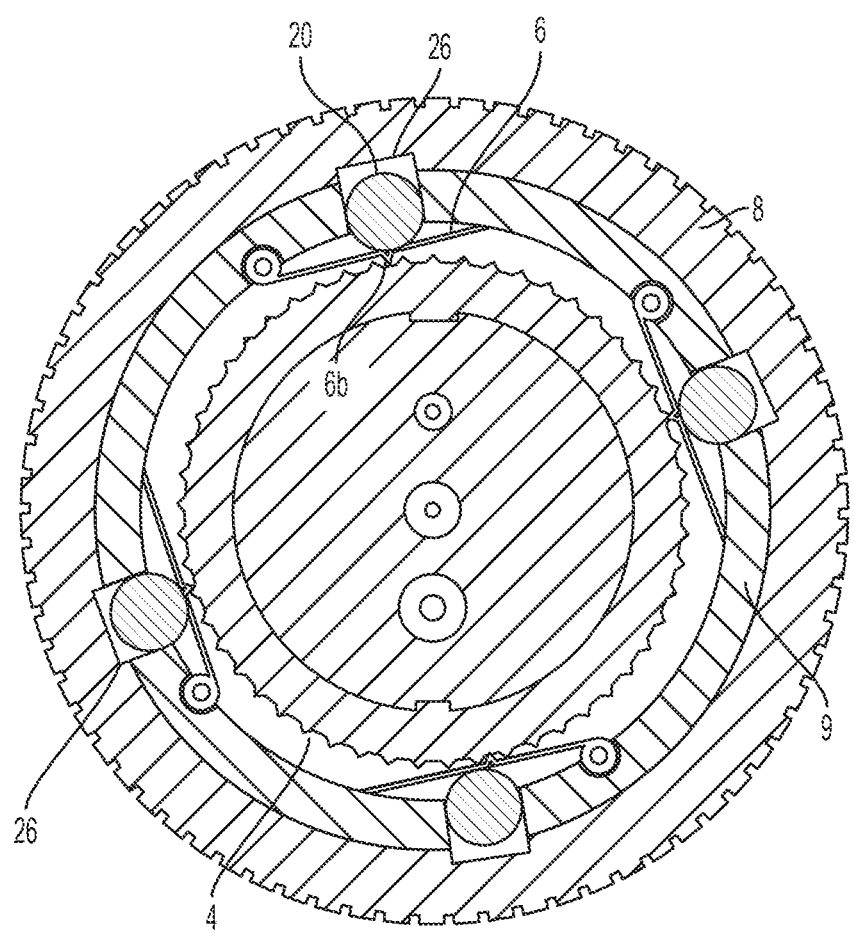
FIG. 9 is a cross-sectional view of the connector taken along the lines 9-9 in FIG. 6.
Figure 10:
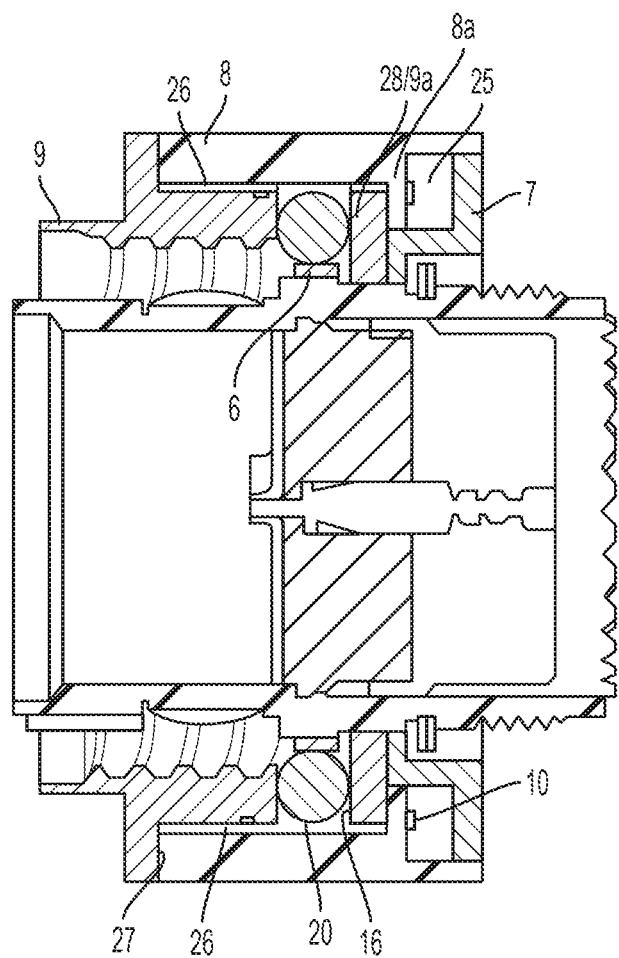
FIG. 10 is a cross-sectional view of the connector taken along the lines 10-10 in FIG. 7.

Referring now to FIGS. 9 and 10, a series of four rectangular-shaped recesses 26 are formed on the inside facing surface of the outer sleeve 8. Each recess 26 extends between the proximal end 27 and a shoulder 8a of the outer sleeve 8. The recesses 26 are radially spaced about the circumference of the outer sleeve 8 in a uniform manner (i.e., separated by ninety degrees).

The shoulder 8a is formed on the inside facing surface of the outer sleeve 8 and extends inwardly. In an assembled form, the shoulder 8a is positioned to abut the distal end 28 and shoulder 9a of the inner sleeve 9. An annular recess 25 is formed between the distal facing surface of the shoulder 8a and the proximal facing surface of the spring retainer 7.

A wave spring 10 is positioned within the annular recess 25. The shoulder 8a is configured to translate within the recess 25 against the bias of the wave spring 10. More particularly, the outer sleeve 8 is configured to translate along the longitudinal axis A and in a distal direction by a predetermined amount with respect to the inner sleeve 9 and the spring retainer 7 against the bias of the wave spring 10.

As best shown in FIG. 4, a series of four springs 6 are mounted to the interior face of the inner sleeve 9. Although only one spring 6 will be described hereinafter, it should be understood that each spring 6 shares the same structure and function. Additionally, the spring 6 may vary from that which is shown and described and may be referred to herein more generally as a releasable locking member.

The spring 6 includes an elongated body formed of an elastic material, such as spring steel. A hinge 6a is provided at one end of the elongated body. As noted above with respect to FIGS. 4 and 11, the hinge 6a is mounted in a respective cutout 22a, which is formed on the interior facing surface of the inner sleeve 9, by the small diameter end of the pin 23. The hinge 6a may be capable of pivoting about the small diameter end of the pin 23.

Figure 12:
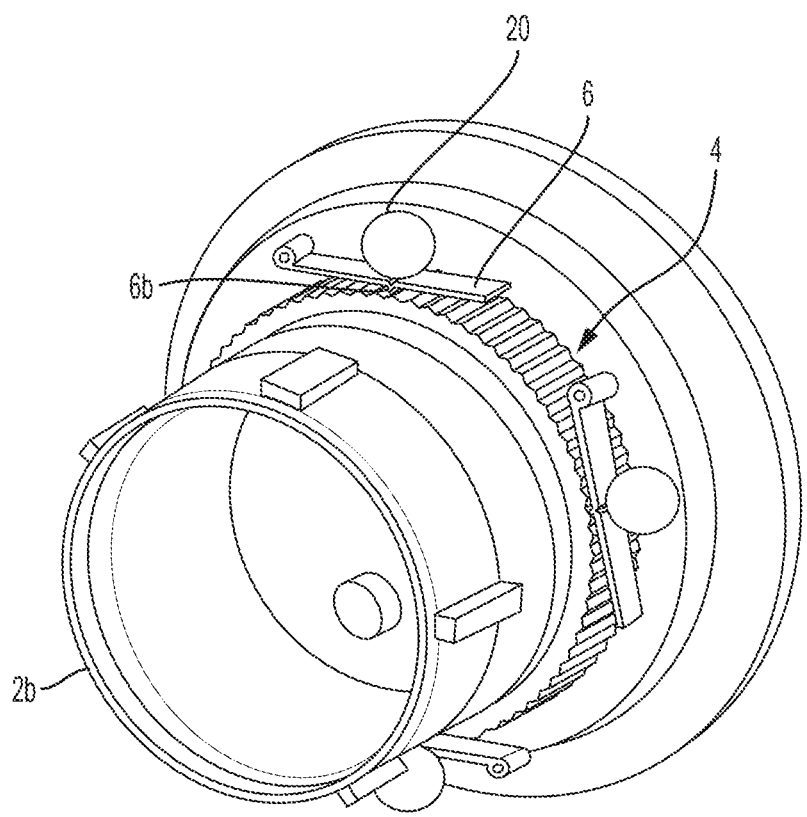
FIG. 12 is a front perspective view of the connector of FIG. 1, shown partially assembled.

As best shown in FIGS. 11 and 12, a bend formed in the center of the spring 6 forms a tooth 6b of the spring 6. In an assembled form of the connector 1, the tooth 6b of the spring 6 engages with the gear teeth 4 of the connector body 2 to control rotation of the inner sleeve 9, as will be described with respect to operation of the connector 1.

The connector 1 includes four balls 20 that are each positioned in respective holes 16 of the first sleeve 9. Each ball 20 has a diameter that is greater than the thickness of the first sleeve 9. Each ball 20 could be replaced by a small cylinder or other member, if so desired. For that reason, a ball 20 may be more generally referred to hereinafter as a moveable member.

The connector 1 includes four releasable locking assemblies that operate together in unison to control rotation of the inner sleeve 9 about the connector body 2. Each releasable locking assembly includes one spring 6, one ball 20, one hole 16 and one recess 26. It should be understood that the number of releasable locking assemblies may vary from that which is shown and described. Also, although not shown, the spring and ball may be integrated together into one single resilient locking component.

Referring now to the operation of the connector 1, starting from the unlocked state shown in FIGS. 6-10, the unlocked connector 1 is connected to the mating connector 104 of the '646 Patent by performing the following steps: (a) manually aligning the lugs 2d of the body 2 within respective channels 105 of the mating connector 104 of the '646 Patent (not shown herein); (b) manually engaging the connection means 17 of the inner sleeve 9 with the connection means 106 of the mating connector 104; (c) manually rotating the outer sleeve 8 (which in turn rotates the inner sleeve 9 due to engagement between the posts 15 and the openings 14a) in a tightening direction, consequently engaging the connection means 17 of the inner sleeve 9 with the connection means 106 of the mating connector 104; and (d) moving the outer sleeve 8 to the locked position in order to prevent inadvertent unlocking of the connector 1.

During rotation step (c), the springs 6 rotate about the connector body 2 along with the sleeves 8 and 9. In the unlocked state of the connector 1, the recesses 26 of the outer sleeve 8 are radially aligned with respective holes 16 in the inner sleeve 9. As the inner sleeve 9 rotates about the body 2, the tooth 6b of each spring 6 moves along the toothed surface 4 of the body 2 (the body 2 remains stationary). The springs 6 flex outwardly toward the outer sleeve 8, as each tooth 6b of the spring 6 moves from one tooth 4 on the body 2 to the next tooth 4 on the body 2. As the springs 6 flex outwardly, the springs 6 push the balls 20 outward and into their respective recesses 26. Stated differently, the clearance space provided by the recesses 26 permit the springs 6 to flex outwardly, which permits the teeth 6b of the springs 6 to slide along the toothed surface 4 as the sleeves 8 and 9 are rotated together. It should be understood that, in the unlocked state of the connector 1, the holes 16 and recesses 26 rotate together such that the holes 16, the recesses 26 and the balls 20 are always radially aligned with each other in the unlocked state of the connector 1.

During rotation step (c), the mating connector 104 translates in an axial direction within the annular space 19 and toward the connector body 2 (or vice versa) without rotating by virtue of the keyed engaged between the lugs 2d and the channels 105. Rotation of the outer sleeve 8 in the tightening direction is possible until the connection means 17 of the connector 1 is fully engaged with the connection means 106 of the mating connector 104. Since the connector 1 is still in the unlocked state at this stage, the outer sleeve 8 (which in turn rotates the inner sleeve 9) may be rotated in a loosening direction, which is opposite to the tightening direction.

During locking step (d), the outer sleeve 8 is retracted (i.e., moved distally) such that the shoulder 8a moves into the space 25 against the bias of spring 10. Moving the outer sleeve 8 in the distal direction causes the posts 15 to exit and separate from their respective openings 14a. The outer sleeve 8 is then capable of being rotated relative to the inner sleeve 9. While the outer sleeve 8 remains retracted, the user then rotates the outer sleeve 8 by a small angle until the posts 15 are aligned with the adjacent set of openings 14b. At this stage, the recesses 26 are misaligned with, or otherwise rotationally spaced from, the holes 16, as shown in FIG. 4. The user then releases the outer sleeve 8, which causes the spring 10 to translate the outer sleeve 8 in the proximal direction (and without rotation). As the outer sleeve 8 moves proximally, the posts 15 enter their respective openings 14*b*.

The connector 1 is then maintained in the locked configuration. In the locked configuration, the sleeves 8 and 9 are prevented from inadvertently rotating in a loosening rotational direction with respect to the connector body 2 and the mating connector 104 due to vibration or other external forces. Attempting to rotate the outer sleeve 8 in the loosening or tightening rotational direction while the outer sleeve 8 is maintained in the locked configuration, either purposefully or inadvertently, causes the surfaces of the teeth 6*b* and 4 to bear on each other (as opposed to slide past each other), thereby preventing rotation of the outer sleeve 8 and the inner sleeve 9 in the loosening direction with respect to the connector body 2 and the mating connector 104. Unlike the unlocked configuration of the connector 1, the springs 6 are not permitted to flex in the outward direction in the locked configuration of the connector 1 because no clearance space exists for the balls 20 and spring 6 to move outwardly. As noted above, in the locked configuration, the recesses 26 are misaligned with the holes 16 in the locked configuration of the connector 1, thus, no clearance space is provided to accommodate outward movement of the balls 20 and springs 6.

Since the connector 1 is maintained in the locked configuration, it cannot be detached from the mating connector 104 without manual intervention by an end user. Thus, the connector body 2 and the mating connector 104 are each prevented from rotating in the loosening rotational direction with respect to the inner sleeve 9, or vice versa, thereby preventing detachment of the mating connector 104 from the connector 1.

To detach the mating connector 104 from the connector 1, it is necessary to first move the outer sleeve 8 from the locked configuration of FIGS. 1-5 to the unlocked configuration of FIGS. 6-10 by pulling the outer sleeve 8 in the distal direction against the force of spring 10. The user then rotates the outer sleeve 8 by a small angle until the posts 15 are aligned with the adjacent set of openings 14*a*. At this stage, recesses 26 are again aligned with the holes 16, as shown in FIG. 4. The user then releases the outer sleeve 8, which causes the spring 10 to translate the outer sleeve 8 in the proximal direction (and without rotation). As the outer sleeve 8 moves proximally, the posts 15 enter their respective openings 14*a*.

The user then manually rotates the outer sleeve 8 (which in turn rotates the inner sleeve 9 due to engagement between the posts 15 and the openings 14*a*) in a loosening direction, thereby slowly disengaging the connection means 17 of the inner sleeve 9 from the connection means 106 of the mating connector 104. During the rotational step, the springs 6 rotate about the connector body 2 along with the sleeves 8 and 9. As the inner sleeve 9 rotates about the body 2, the tooth 6*b* of each spring 6 slides along the toothed surface 4 of the body 2 (the body 2 is stationary). The springs 6 flex outwardly toward the outer sleeve 8, as each tooth 6*b* moves from one tooth 4 of the body 2 to the next tooth 4 of the body 2. As the springs 6 flex outwardly, the springs 6 push the balls 20 outward into their respective recesses 26. Eventually, the connection means 17 of the inner sleeve 9 separate and detach from the connection means 106 of the mating connector 104.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A connector comprising:
   a connector body including an outer surface defining a longitudinal axis and gear teeth disposed on the outer surface;
   a first sleeve rotatably coupled to said connector body, said first sleeve having a sidewall, wherein the sidewall of the first sleeve is formed to define a hole therethrough;
   a moveable member positioned in the hole formed in the sidewall of the first sleeve;
   a second sleeve positioned over said first sleeve and movable with respect to the first sleeve between a locked position and an unlocked position, said second sleeve having a sidewall, wherein the sidewall of the second sleeve is formed to define a recess;
   a releasable locking member at least partially positioned between the gear teeth and the moveable member, said releasable locking member having a mating surface configured to engage the gear teeth of the connector body,
   wherein in the unlocked position of the second sleeve, said recess is configured to at least partially align with said hole, and, upon rotation of said first sleeve relative to said connector body, said moveable member is configured to translate into said recess of said second sleeve to facilitate sliding of said mating surface of said releasable locking member along said gear teeth of said connector body, and
   wherein in the locked position of the second sleeve, said recess is rotationally spaced from the hole, and, said mating surface of said releasable locking member is locked between said gear teeth of said connector body and said moveable member to prevent rotation of said first sleeve with respect to said connector body, and
   a first engagement member provided on one of the first and the second sleeves and two second engagement members that are spaced apart and provided on the other one of the first sleeve and the second sleeve, wherein in the unlocked position of the second sleeve, the first engagement member is mated with one of the second engagement members, and wherein in the locked position of the second sleeve, the first engagement member is mated with another of the second engagement members.

2. The connector of claim 1, wherein the first engagement member is a post provided on one of the first and second sleeve, and wherein the second engagement members are each an opening formed in the other one of the first and second sleeve.

3. The connector of claim 2 wherein either:
   (a) the first sleeve includes the two openings and the second sleeve includes the post, and, in the unlocked position of the second sleeve, the post is mated with one opening of the two openings, and, in the locked position of the second sleeve, the post is mated with the other opening of the two openings, or
   (b) the first sleeve incudes the post and the second sleeve includes the two openings, and, in the unlocked position of the second sleeve, the post is mated with one opening of the two openings of the second sleeve, and, in the locked position of the second sleeve, the post is mated with the other opening of the two openings of the second sleeve; and wherein, in the engaged position, the post is mated with one of the two openings and, in the disengaged position, the post is disengaged from the openings and thereby enabling rotation of the second sleeve with respect to the first sleeve between the unlocked and locked positions.

4. The connector of claim 1, wherein the second sleeve is movable with respect to the first sleeve along the longitudinal axis between a first position in which the first engagement member is engaged with one of the second engagement members and a second position in which the first engagement member is disengaged from the second engagement members, and, wherein in the second position of the second sleeve, the second sleeve is rotatable with respect to the first sleeve between the unlocked and locked positions.

5. The connector of claim 1, wherein said first sleeve is configured to rotate along with the second sleeve in the unlocked position of the second sleeve.

6. The connector of claim 1, wherein said mating surface of said releasable locking member is a gear tooth that engages with the gear teeth of said connector body.

7. The connector of claim 1, wherein the releasable locking member is a spring mounted to the first sleeve.

8. The connector of claim 1, wherein said first sleeve includes means for connecting with a first mating connector.

9. The connector of claim 8, wherein said connector body includes means for connecting with a second mating connector.

10. A connector comprising:
a connector body including an outer surface defining a longitudinal axis and gear teeth disposed on the outer surface;
a first sleeve rotatably coupled to said connector body, said first sleeve having a sidewall including a hole formed in the sidewall;
a moveable member positioned in the hole of the first sleeve;
a second sleeve positioned over said first sleeve and movable with respect to the first sleeve between a locked position and an unlocked position, said second sleeve having a sidewall including a recess;
a releasable locking member at least partially positioned between the moveable member and the gear teeth, said releasable locking member having a mating surface configured to engage the gear teeth of the connector body,
wherein in the unlocked position of the second sleeve, said recess is configured to at least partially rotationally align with said hole, and, upon rotation of said first sleeve, said moveable member is configured to translate into said recess of said second sleeve to facilitate sliding of said mating surface of said releasable locking member along said gear teeth of said connector body, and wherein in the locked position of the second sleeve, said recess is rotationally spaced from said hole, and, said mating surface of said releasable locking member is locked between said gear teeth of said connector body and said moveable member to prevent rotation of said first sleeve with respect to said connector body; and
a post provided on one of the first sleeve and the second sleeve and wherein the other sleeve among the first sleeve and the second sleeve are formed to include two openings, wherein in the unlocked position of the second sleeve, the post is mated with one opening of the two openings, and, in the locked position of the second sleeve, the post is mated with the other opening of the two openings.

11. The connector of claim 10, wherein said first sleeve is configured to rotate along with the second sleeve when the post is mated with an opening in the unlocked position of the second sleeve.

12. The connector of claim 10, wherein said mating surface of said releasable locking member is a gear tooth that is configured to engage with the gear teeth of said connector body.

13. The connector of claim 10, wherein said moveable member is a ball.

14. The connector of claim 13, wherein the ball has a diameter greater than a thickness of the first sleeve.

15. The connector of claim 10, wherein said first sleeve includes means for connecting with a first mating connector.

16. The connector of claim 15, wherein said connector body includes means for connecting with a second mating connector.

17. The connector of claim 10 wherein either:
(a) the first sleeve incudes the two openings and the second sleeve includes the post, and, in the unlocked position of the second sleeve, the post is mated with the one opening of the two openings, and, in the locked position of the second sleeve, the post is mated with the other opening of the two openings, or
(b) the first sleeve incudes a post and the second sleeve includes the two openings, and, in the unlocked position of the second sleeve, the post is mated with one opening of the two openings of the second sleeve, and, in the locked position of the second sleeve, the post is mated with the other opening of the two openings of the second sleeve.

18. The connector of claim 10, wherein said second sleeve is configured to rotate and translate with respect to said first sleeve upon moving said second sleeve between the locked and unlocked positions.

19. The connector of claim 10, further comprising a spring that is positioned to bias the mating surface of the releasable locking member against the gear teeth of the connector body.

* * * * *